(12) United States Patent
Cen et al.

(10) Patent No.: US 10,649,642 B2
(45) Date of Patent: May 12, 2020

(54) REMAPPING INTERFACE ELEMENTS ON A USER INTERFACE

(71) Applicant: International Business Machines Corporation, Armonk, NY (US)

(72) Inventors: Zai Cen, Ningbo (CN); Jie Jiang, Ningbo (CN); Wen Juan Nie, Ningbo (CN); Qi Ruan, Ningbo (CN); Li Zhang, Ningbo (CN); Chao Xing Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 15/070,391

(22) Filed: Mar. 15, 2016

(65) Prior Publication Data

US 2017/0269818 A1 Sep. 21, 2017

(51) Int. Cl.
*G06F 3/0486* (2013.01)
*G06F 3/0482* (2013.01)

(52) U.S. Cl.
CPC .......... *G06F 3/0486* (2013.01); *G06F 3/0482* (2013.01)

(58) Field of Classification Search
CPC ... G06F 3/04842; G06F 3/0486; G06F 3/0482
USPC .......................................... 715/763
See application file for complete search history.

(56) References Cited

U.S. PATENT DOCUMENTS

| 8,601,370 | B2 * | 12/2013 | Chiang | G06F 3/04817 |
| | | | | 715/700 |
| 8,769,431 | B1 * | 7/2014 | Prasad | G06F 3/048 |
| | | | | 715/788 |
| 2005/0091609 | A1 * | 4/2005 | Matthews | G06F 3/0482 |
| | | | | 715/804 |
| 2006/0218502 | A1 * | 9/2006 | Matthews | G06F 3/0482 |
| | | | | 715/779 |
| 2007/0157089 | A1 * | 7/2007 | Van Os | G06F 3/04817 |
| | | | | 715/702 |

(Continued)

FOREIGN PATENT DOCUMENTS

| CN | 103440091 A | 12/2013 |
| EP | 2669777 A1 | 12/2013 |
| EP | 2882173 A1 | 6/2015 |

OTHER PUBLICATIONS

Joshua Phillips, Demand Media, "How to Copy and Paste Icons for Start Menu Shortcuts", published Oct. 2, 2015, downloaded Jan. 29, 2018 pp. 1-3*

(Continued)

*Primary Examiner* — Li P Sun
*Assistant Examiner* — Henry Orr
(74) *Attorney, Agent, or Firm* — Andrew Aubert

(57) ABSTRACT

A method, executed by a computer, for remapping interface elements on a graphical user interface includes activating an action capture mode responsive to input from a user, receiving a selection of an interface element, responsive to input from the user that uses the action capture mode, adding an alias user interface element corresponding to the interface element to a shortcut group, and wherein activation of the alias user interface element performs an action corresponding to the interface element. A computer program product and computer system corresponding to the above method are also disclosed herein.

14 Claims, 5 Drawing Sheets

(56) References Cited

U.S. PATENT DOCUMENTS

| | | | | |
|---|---|---|---|---|
| 2008/0282202 | A1* | 11/2008 | Sunday | G06F 3/0483 715/863 |
| 2010/0281430 | A1* | 11/2010 | Safar | G06F 3/0488 715/834 |
| 2011/0050975 | A1* | 3/2011 | Chung | G06F 1/1624 348/333.02 |
| 2012/0169623 | A1* | 7/2012 | Grossman | G06F 3/0416 345/173 |
| 2012/0235921 | A1* | 9/2012 | Laubach | G06F 3/0238 345/172 |
| 2012/0240068 | A1* | 9/2012 | McCann | G06F 16/901 715/765 |
| 2013/0010000 | A1* | 1/2013 | Chiu | G06F 3/0488 345/676 |
| 2015/0169146 | A1* | 6/2015 | Lalwani | G06F 3/0482 715/811 |

OTHER PUBLICATIONS

Craig Snyder, "Launch Multiple Programs From a Single Shortcut Using a Batch File", published Oct. 30, 2014 URLhttps://www.makeuseof.com/tag/launch-multiple-programs-single-shortcut-using-batch-file/ (Year: 2014).*

"My Buttons", by Throw Lab, Updated: Jun. 11, 2014, Version: 1.3, © 2011 Throw Lab, 2 pages, <https://itunes.apple.com/en/app/my-buttons/id425274534?mt=8>.

"One-hand operation on mobile phone with large screen", printed on Dec. 7, 2015, English translation, 9 pages, <http://www.leiphone.com/news/201406/one-hand-operation.html>.

"Swipe Launcher", Swipe Launcher—Android Apps on Google Play, printed on Dec. 3, 2015, 4 pages, <https://play.google.com/store/apps/details?id=com.zentertain.easyswipe&hl=en>.

* cited by examiner

US 10,649,642 B2

REMAPPING INTERFACE ELEMENTS ON A USER INTERFACE

BACKGROUND OF THE INVENTION

The present invention relates generally to graphical user interfaces, and more specifically, to remapping the actions of interface elements on a user interface.

In the field of user interfaces, a user becomes proficient with a software application by learning the various functions of the application. An application's functions may be activated by interface elements that perform such actions as "return to previous page," "open file," "save file," and the like. Interface elements may commonly be represented by symbols. One challenge for a user is learning the location and function of interface elements, especially across different applications.

SUMMARY

As disclosed herein, a method, executed by a computer, for remapping interface elements on a graphical user interface includes activating an action capture mode responsive to input from a user, receiving a selection of an interface element, responsive to input from the user that uses the action capture mode, adding an alias user interface element corresponding to the interface element to a shortcut group, and wherein activation of the alias user interface element performs an action corresponding to the interface element. A computer program product and computer system corresponding to the above method are also disclosed herein.

DETAILED DESCRIPTION

Embodiments of the present invention relate generally to graphical user interfaces, and more specifically, to remapping the actions of interface elements on a user interface. An interface element, also known as a graphical user interface icon, may be defined as a small picture or symbol on a graphical user interface that represents a program, command, file, directory, or device (such as a hard disk or removable storage). Remapping interface elements to a particular area, such as a shortcut group, enables a user to access different actions in a consistent fashion across applications. For example, a user may remap the "save" feature of several applications to the same location in the shortcut group, so that the user can save quickly via the remapped element without having to hunt down the particular "save" interface element specific to a given application. One-handed operation of a device may also be facilitated by enabling an application's interface elements to be remapped to a shortcut group.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
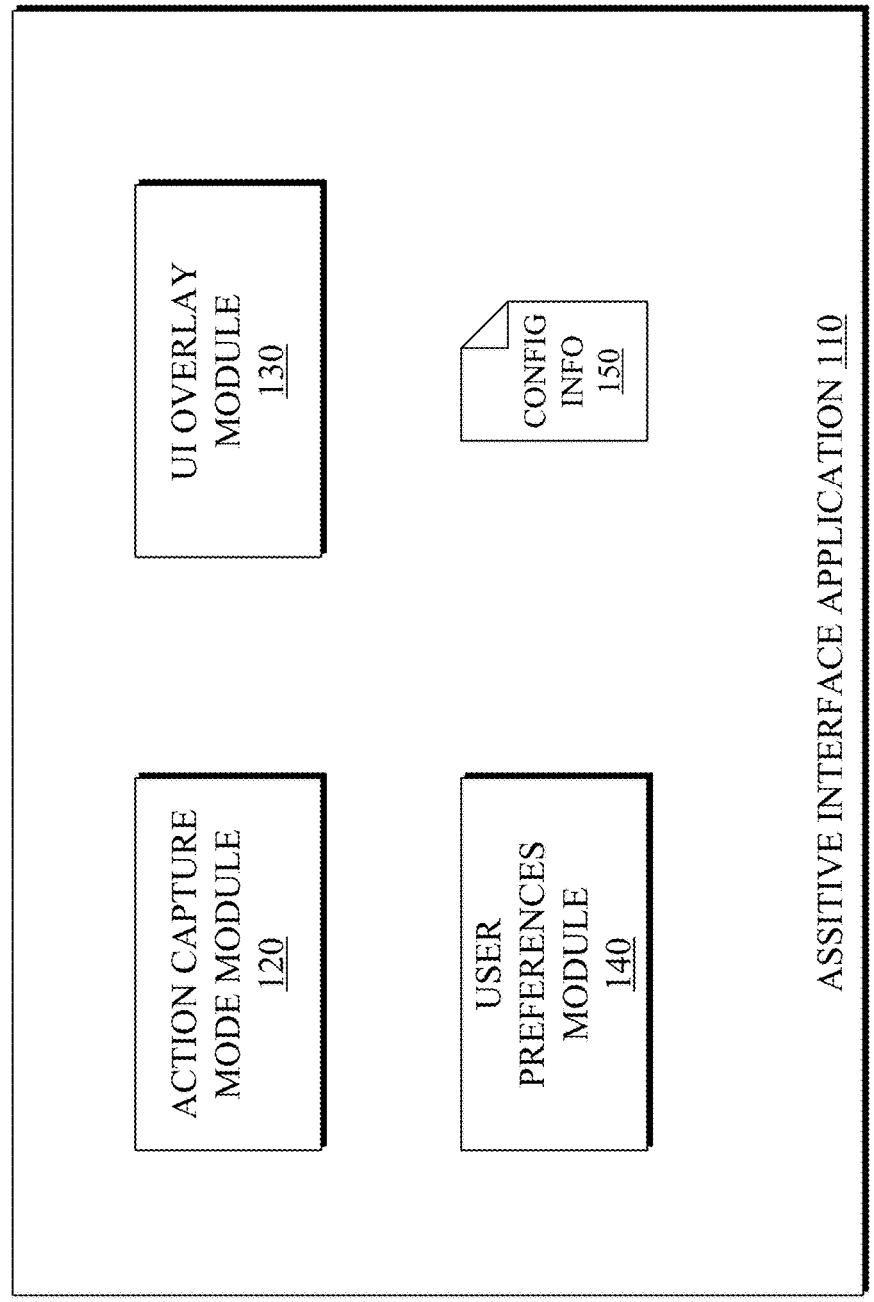
FIG. 1 is a block diagram depicting one embodiment of an action remapping system in accordance with the present invention.

FIG. 1 is a block diagram depicting one embodiment of an action remapping system 100 in accordance with the present invention. As depicted, FIG. 1 includes an assistive interface application 110, an action capture mode module 120, a user interface (UI) overlay module 130, a user preferences module 140, and configuration information 150. The action remapping system 100 enables a user to customize a shortcut group such as by selectively picking and choosing which interface elements are to be remapped.

The assistive interface application 110 may control the remapping of interface elements on an action group and may enable a user to modify the preferences regarding the behavior of the remapped interface elements and/or action group. The assistive interface application 110 may be installed on a system level in order to provide control over the behaviors of any application installed on the operating system (e.g., the assistive interface application 110 need not be application-specific). In some embodiments, since the assistive interface application 110 is installed on a system level, it is compatible with any application regardless of whether the application was originally designed to interoperate with the assistive interface application 110.

The action capture mode module 120 may manage the behavior of the action capture mode. In some embodiments, the action capture mode module 120 enables the entry to and exit from the action capture mode according to input from a user. The action capture mode module 120 may receive user input as to which sort of actions to capture from an interface element. In some embodiments, the action capture mode module 120 differentiates between the recording of various actions on the same interface element, such as single-tap vs. double-tap, click vs. click-and-hold, click vs. click-and-drag, light tap vs. strong/forceful tap, and the like.

The UI overlay module 130 may control the overlaying of the user interface for the assistive interface application 110 over any application on a device. In some embodiments, the UI overlay module 130 overlays a shortcut group over a portion of an application's native user interface. The user preferences module 140 may enable a user to change certain aspects of the behavior of UI overlay module 130, such as in which area of an application's user interface the shortcut group will appear, how large the shortcut group will be, the arrangement of interface elements on the shortcut group, and the like.

The user preferences module 140 may also be responsible for enabling a user to access and save user preferences for the assistive interface application 110. User preferences may include how to activate the shortcut group, how to modify the shortcut group, how to show or hide the shortcut group, whether the shortcut group auto-hides, how much time elapses before the shortcut group may auto-hide, and the like. In some embodiments, the user preferences module 140 enables a user to select one or more themes, color schemes, aesthetics, geometries, and/or designs for the shortcut group and its interactive elements. The configuration information 150 may be used to save the various settings and user preferences of the assistive interface application 110 and its modules. Initially, the configuration information 150 may be provided with predetermined default settings that will be interpreted by the assistive interface application 110 and its various modules.

FIGS. 2A-2D depict examples of one embodiment of a user interface 200 in accordance with the present invention. As depicted, the user interface 200 includes a collapsed action group 210, an activated action group 220, a radar interface element 230, an alias radar interface element 240, a home interface element 250, and an alias home interface element 260. One or more actions of the radar interface element 230 and the home interface element 250 are remapped to the alias radar interface element 240 and the alias home interface element 260, respectively. While "interface element" may refer to a part of a program's native user interface, an "alias" interface element may act as a shortcut for a native interface element. For example, when a user activates the alias home interface element 260, user interface 200 may respond as though the user had activated the home interface element 250.

Figure 2B:
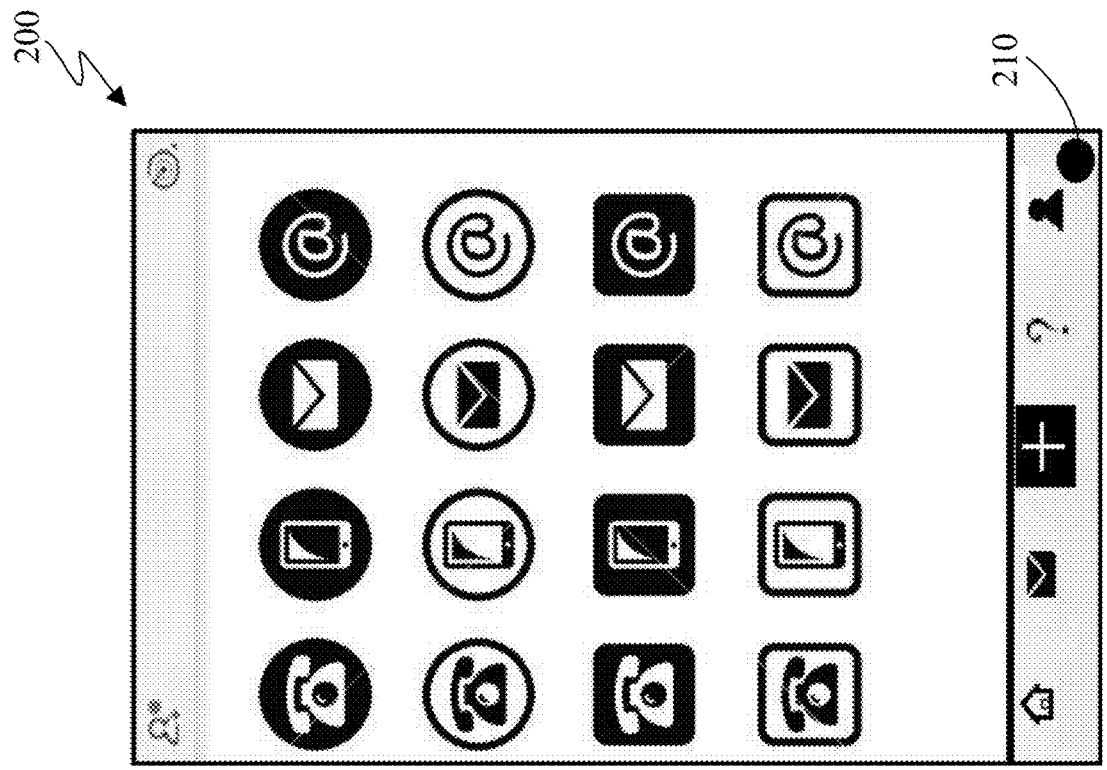
FIGS. 2A-2D depict examples of one embodiment of a user interface in accordance with the present invention.
Figure 2A:
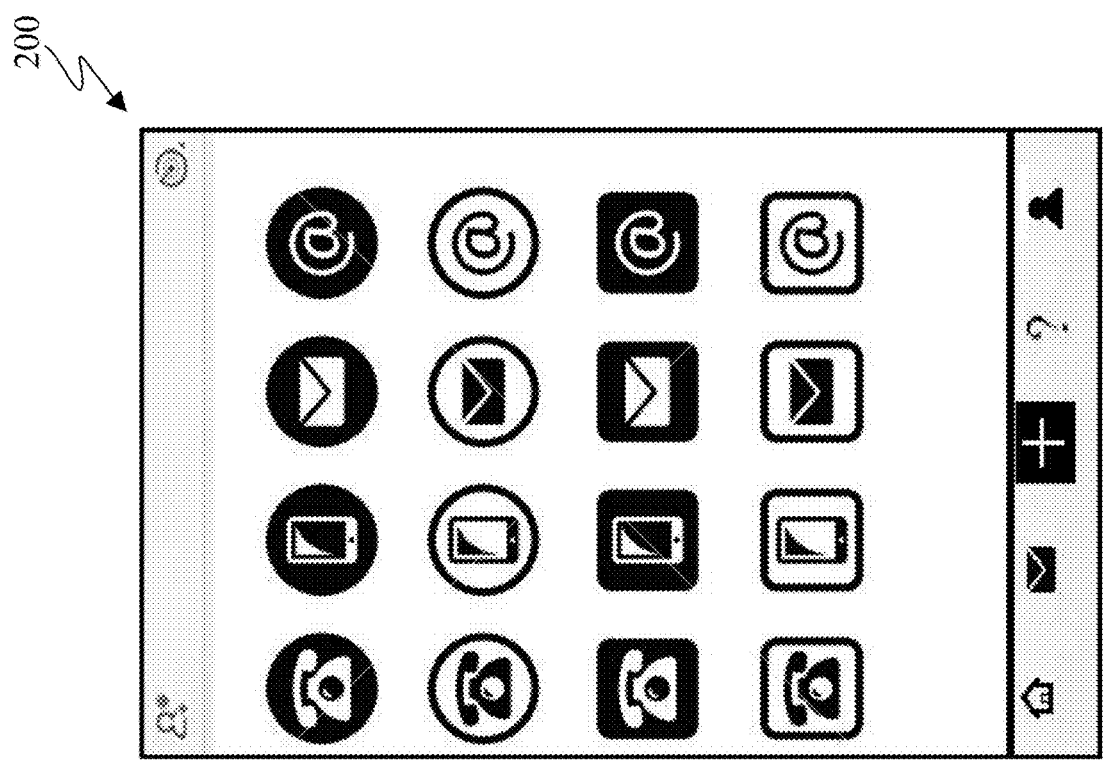

FIG. 2A depicts an example of an embodiment of a user interface 200 without any remapped interface elements or a shortcut group. FIG. 2B, in contrast, depicts a user interface 200 with a collapsed action group 210. As depicted, the collapsed action group 210 is a small circle positioned in an area of the user interface 200 such that it will not obstruct the application's native interface. In other embodiments, the collapsed action group 210 is represented by any shape, animation, or other sort of indicator. The location of the collapsed action group 210 may be subject to input from a user, who may choose to place it in any location on the user interface 200, such as different corners. In some embodiments, the position of the collapsed action group 210 is application-specific. The action group 210 may not be indicated on the user interface 200 at all, which would require the user to remember a particular location in which to uncollapse the "invisible" collapsed action group 210.

Figure 2C:
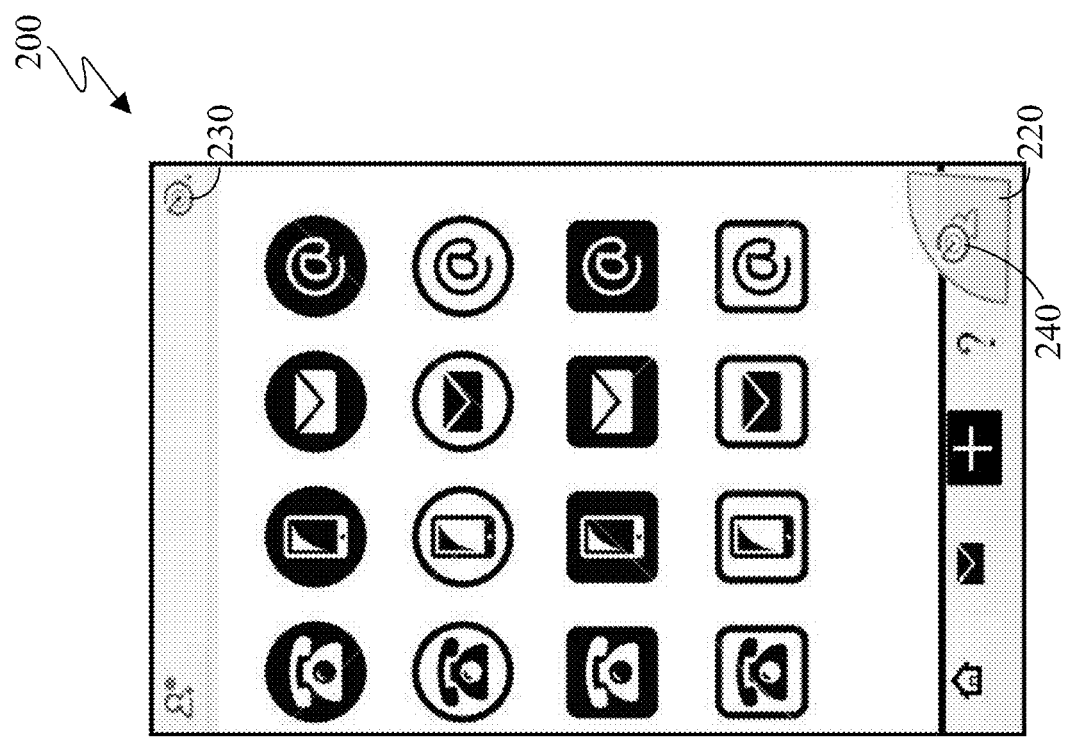
Figure 2D:
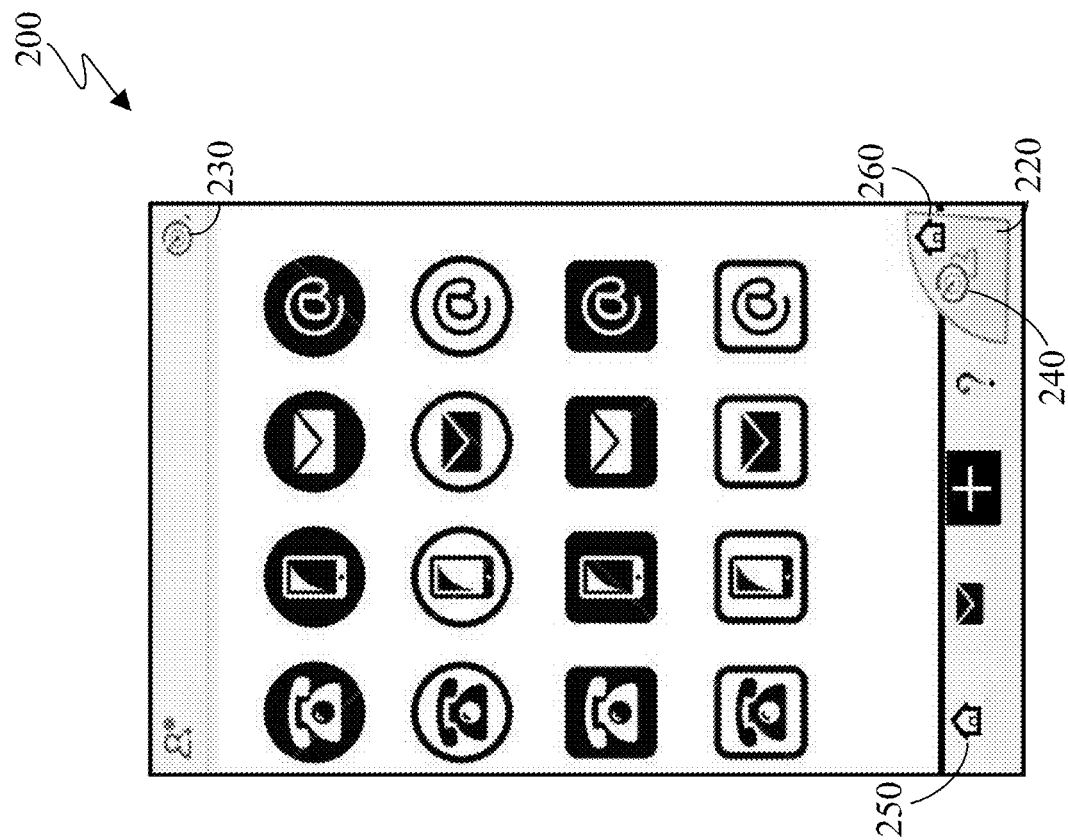

FIGS. 2C and 2D depict examples of an embodiment of a user interface 200 with an activated action group 220. The collapsed action group 210 may expand to the activated action group 220 upon input from a user. Such user input may include tapping the collapsed action group 210, swiping from the collapsed action group 210 to another area of the user interface 200, double-clicking the collapsed action group 210, activating a hardware button, or the like. FIG. 2C depicts an activated action group 220 with one alias interface element on it. The radar interface element 230 is remapped as the alias radar interface element 240 on the activated action group 220, which may hold all of the alias interface elements. In FIG. 2D, another interface element is remapped onto the activated action group 220; the home interface element 250 is remapped as the alias home interface element 260.

The user may remap an interface element to the action group by providing input such as dragging the interface element to the activated action group 220. In some embodiments, an interface element may be remapped to the action group by dragging the collapsed action group 210 to the interface element. The action group may be provided with alias interface elements by any means of input, and a user may be able to select their preferred means of input. It should be noted that the depicted radar interface element 230 and home interface elements 250 are merely illustrative, and any possible combination of interface elements on a user interface 200 may be suitable to be remapped to the action group as alias interface elements.

Thus, by grouping any or all of the interface elements of an application's user interface 200 onto the shortcut group, a user may find a convenient location for interface elements that may enable consistent organization across applications. When a user activates an alias interface element, it may perform the same action as if the user activates the original interface element. Furthermore, by remapping interface elements to an action group, a user may be able to operate an application one-handedly; for example, in the case of a smartphone that is held in one hand when the action group is located in a location accessible by a user's thumb. In some embodiments, a user may rearrange or remove alias interface elements from the action group.

Figure 3:
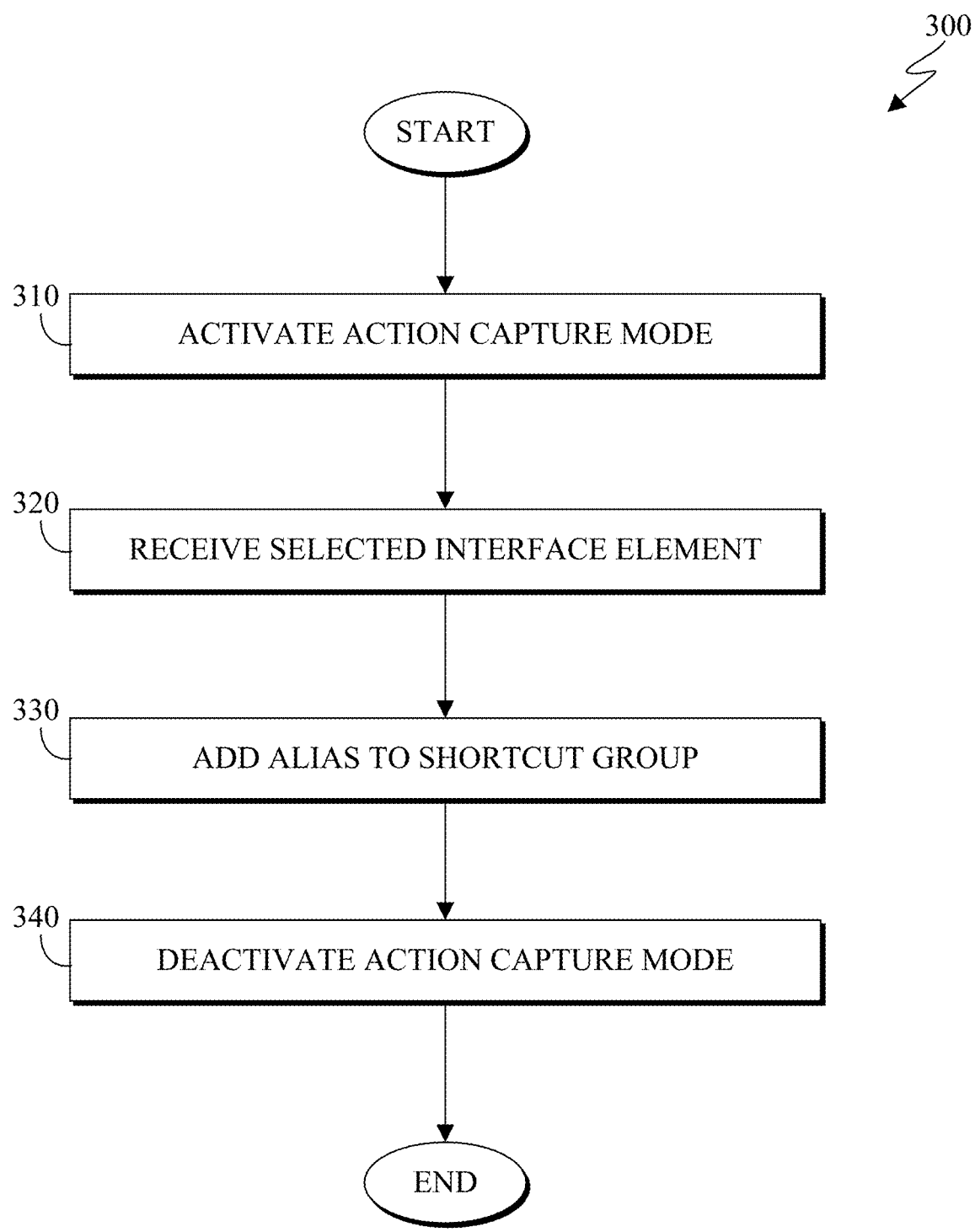
FIG. 3 is a flow chart depicting one embodiment of an action remapping method in accordance with the present invention.

FIG. 3 is a flow chart depicting one embodiment of an action remapping method 300 in accordance with the present invention. As depicted, FIG. 3 includes activating (310) the action capture mode, receiving (320) a selected interface element, adding (330) an alias interface element to the shortcut group, and deactivating (340) the action capture mode. The action remapping method 300 may enable a user to create and customize alias interface elements on a user interface in a location convenient to the user.

Activating (310) the action capture mode may include entering into the action capture mode in response to input from a user. The input from a user may include pressing a particular button, performing a keystroke, inputting a sequence into a haptic interface, and the like, and this activating input may be customizable. Assistive interface application 110 having entered the action capture mode may be indicated by an animation, icon, color change, or other alteration to the user interface. In some embodiments, the input from a user is haptic input.

Receiving (320) a selected interface element may include receiving input from a user that one or more interface elements are to be remapped to an action group. In some embodiments, the user may make a selection of interface elements while in the action capture mode. The action capture mode may record specific actions of a user to be provided to an alias interface element; for example, double-tapping an interface element while in the action capture mode may capture only the double-tap action of the interface element.

Adding (330) an alias interface element to a shortcut group may include adding one or more alias interface elements to a shortcut group that corresponds to one or more selected interface elements. In some embodiments, the icon for each alias interface element is the same as, or similar to, the icon of the interface element to which the alias element corresponds. The alias interface elements and shortcut group may be presented as a radial menu. The actions that are captured and the arrangement of alias interface elements may be saved in the configuration information 150.

Deactivating (340) the action capture mode may include receiving input from a user to exit the action capture mode. The particular type and mode of input may be customizable by a user via the user preferences module 140 and saved in configuration information 150.

Figure 4:
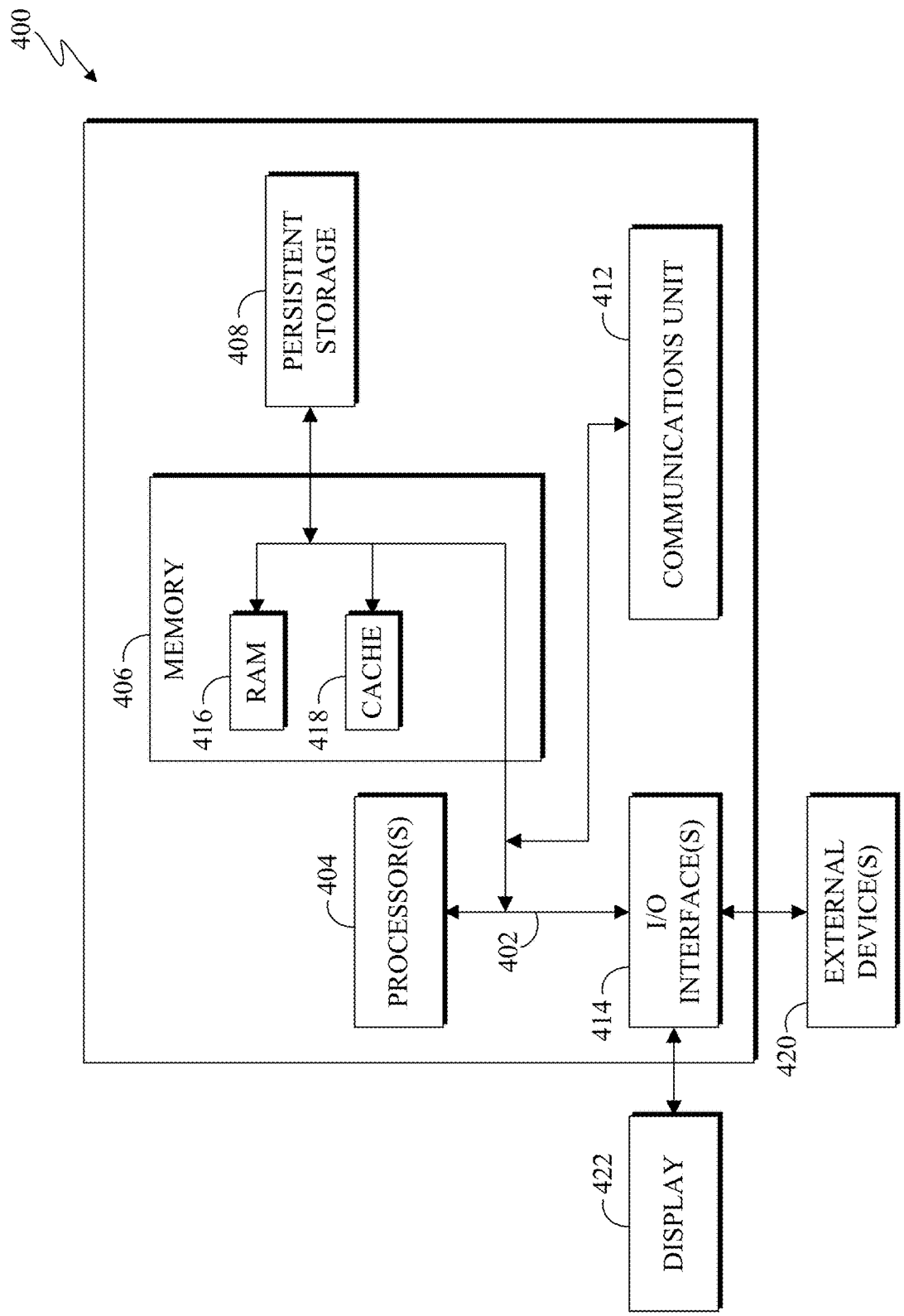
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method (CIM) for remapping interface elements on a graphical user interface, the method comprising:
    activating an action capture mode responsive to dragging from a shortcut group to a first interface element;
    receiving a selection of the first interface element, responsive to the activated action capture mode, with the first interface element corresponding to a first functional action of a first application;
    in response to dragging the selected first interface element to the shortcut group, adding an alias user interface element corresponding to the first interface element to the shortcut group;
    receiving a selection of a second interface element, during the activated action capture mode, with the second interface element corresponding to a second functional action of a second application;
    in response to dragging the second selected interface element to the shortcut group, mapping the second functional action of the second application to the alias user interface element, such that the alias user interface element is simultaneously mapped to both the first functional action of the first application and the second functional action of the second application;
    displaying the shortcut group, including the alias user interface element, as an overlay over a user interface of the first application, during operation of the first application;
    activating the first functional action of the first application, responsive to a first input from the user corresponding to activation of the alias user interface element;
    displaying the shortcut group, including the alias user interface element, as an overlay over a user interface of the second application, during operation of the second application; and
    activating the second functional action of the second application, responsive to a second input from the user corresponding to activation of the alias user interface element;
    wherein:
    the first functional action is a save file functional action; and
    the second functional action is a save file functional action.

2. The method of claim 1, wherein the shortcut group is a radial menu in a corner of a graphical user interface.

3. The method of claim 1, wherein the shortcut group enables one-handed operation of a device.

4. The method of claim 1, wherein a mapping data set including information indicative of the mapped first functional action of the first application and second functional action of the second application to the alias user interface element is stored at a system level for a computer device.

5. The method of claim 1, wherein the shortcut group is collapsible responsive to input from the user.

6. A computer system (CS) for remapping interface elements on a graphical user interface, the computer system comprising:
    one or more computer processors;
    one or more computer readable storage media;
    program instructions stored therein for execution by at least one of the one or more computer processors, the program instructions including instructions for causing the one or more computer processors to perform operations including the following:
  activating an action capture mode responsive to dragging from a shortcut group to a first interface element,
  receiving a selection of the first interface element, responsive to the activated action capture mode, with the first interface element corresponding to a first functional action of a first application,
  in response to dragging the selected first interface element to the shortcut group, adding an alias user interface element corresponding to the first interface element to the shortcut group,
  receiving a selection of a second interface element, during the activated action capture mode, with the second interface element corresponding to a second functional action of a second application,
  in response to dragging the second selected interface element to the shortcut group, mapping the second functional action of the second application to the alias user interface element, such that the alias user interface element is simultaneously mapped to both the first functional action of the first application and the second functional action of the second application,
  displaying the shortcut group, including the alias user interface element, as an overlay over a user interface of the first application, during operation of the first application,
  activating the first functional action of the first application, responsive to a first input from the user corresponding to activation of the alias user interface element,
  displaying the shortcut group, including the alias user interface element, as an overlay over a user interface of the second application, during operation of the second application, and
  activating the second functional action of the second application, responsive to a second input from the user corresponding to activation of the alias user interface element;
wherein:
the first functional action is a save file functional action; and
the second functional action is a save file functional action.

7. The computer system of claim 6, wherein the shortcut group is a radial menu in a corner of a graphical user interface.

8. The computer system of claim 6, wherein the shortcut group enables one-handed operation of a device.

9. The computer system of claim 6, wherein a mapping data set including information indicative of the mapped first functional action of the first application and second functional action of the second application to the alias user interface element is stored at a system level for a computer device.

10. The computer system of claim 6, wherein the shortcut group is collapsible responsive to input from the user.

11. A computer program product (CPP) for remapping interface elements on a graphical user interface, the computer program product comprising:
a computer readable storage medium; and
program instructions stored on the computer readable storage medium, the program instructions including instructions for causing a processor(s) set to perform operations including the following:
  activating an action capture mode responsive to dragging from a shortcut group to a first interface element,
  receiving a selection of the first interface element, responsive to the activated action capture mode, with the first interface element corresponding to a first functional action of a first application,
  in response to dragging the selected first interface element to the shortcut group, adding an alias user interface element corresponding to the first interface element to the shortcut group,
  receiving a selection of a second interface element, during the activated action capture mode, with the second interface element corresponding to a second functional action of a second application,
  in response to dragging the second selected interface element to the shortcut group, mapping the second functional action of the second application to the alias user interface element, such that the alias user interface element is simultaneously mapped to both the first functional action of the first application and the second functional action of the second application,
  displaying the shortcut group, including the alias user interface element, as an overlay over a user interface of the first application, during operation of the first application,
  activating the first functional action of the first application, responsive to a first input from the user corresponding to activation of the alias user interface element,
  displaying the shortcut group, including the alias user interface element, as an overlay over a user interface of the second application, during operation of the second application, and
  activating the second functional action of the second application, responsive to a second input from the user corresponding to activation of the alias user interface element;
wherein:
the first functional action is a save file functional action; and
the second functional action is a save file functional action.

12. The computer program product of claim 11, wherein the shortcut group is a radial menu in a corner of a graphical user interface.

13. The computer program product of claim 11, wherein the shortcut group enables one-handed operation of a device.

14. The computer program product of claim 11, wherein a mapping data set including information indicative of the mapped first functional action of the first application and second functional action of the second application to the alias user interface element is stored at a system level for a computer device.

* * * * *